Nov. 17, 1970 P. E. PROZELLER 3,541,446

SMALL SIGNAL ANALOG TO DIGITAL CONVERTER WITH POSITIVE CANCELLATION OF ERROR VOLTAGES

Filed Sept. 30, 1968

3 Sheets-Sheet 1

INVENTOR
P. E. PROZELLER
BY Alfred G. Steinmetz
ATTORNEY

Nov. 17, 1970 P. E. PROZELLER 3,541,446

SMALL SIGNAL ANALOG TO DIGITAL CONVERTER WITH POSITIVE CANCELLATION OF ERROR VOLTAGES

Filed Sept. 30, 1968 3 Sheets-Sheet 3

United States Patent Office 3,541,446

Patented Nov. 17, 1970

3,541,446

SMALL SIGNAL ANALOG TO DIGITAL CONVERTER WITH POSITIVE CANCELLATION OF ERROR VOLTAGES

Paul E. Prozeller, Matawan, N.J., assignor to Bell Telephone Laboratories, Incorporated, Murray Hill and Berkeley Heights, N.J., a corporation of New York Filed Sept. 30, 1968, Ser. No. 763,777
Int. Cl. G01r 17/06, 1/02
U.S. Cl. 324—99 5 Claims

ABSTRACT OF THE DISCLOSURE

An analog voltage is stored in an energy storage device which is discharged by a constant current source. The time necessary to discharge the energy storge device is directly proportional to the amplitude of the analog voltage. A reference current feedback system reduces measurement errors by compensating for residual charge components within the converter.

FIELD OF THE INVENTION

Figure 1:
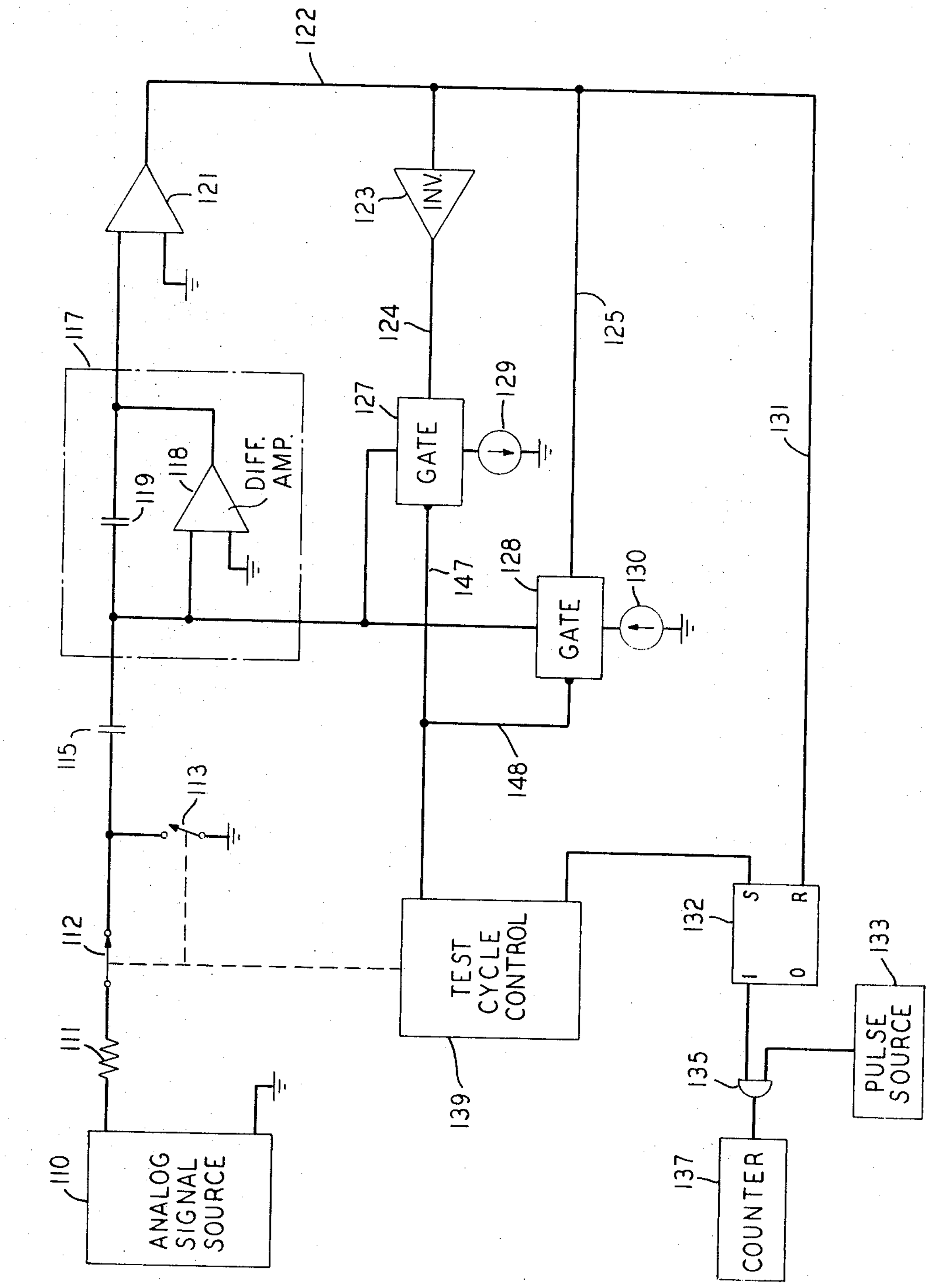

This invention relates to analog-to-digital converters and, more particularly, to a pulse width modulation type converter wherein an analog voltage is converted into a pulse duration.

BACKGROUND OF THE INVENTION

In many cases, analog information that is to be transmitted over long distance transmission lines can be most advantageously transmitted in digital form. The chief advantage of digital transmission is the ease with which the information signal can be separated from signal noise disturbances. A typical situation, in which information contained in analog signals is transmitted over great distances, is the transmission of electrical measurements automatically made at remote stations to a master station.

The information contained in the analog signal to be transmitted must be accurately transformed into its digital form in order to fully realize the benefits of the accuracy of digital transmission. A suitable analog-to-digital conversion system, of the type with which the invention is concerned, samples a voltage related to the analog signal, stores the sample in an energy storage device and times the duration necessary to discharge the energy storage device. In one particular embodiment of this conversion system, a sample of the analog signal voltage amplitude is stored in a storage capacitor. The storage capacitor is discharged with a predetermined standard reference current. During this discharge period a periodic pulse source is gated to a counter. The number of pulses counted by the counter is encoded into a digital representation of the analog signal amplitude.

The above-described converter embodiment while suitable for the analog-to-digital conversion of large voltages is too inaccurate for the conversion of small voltages in the millivolt range due to extraneous currents and residual voltages contained on the energy storage components within the conversion circuit. To accurately convert a small analog signal to digital form, it is necessary that these extraneous residual charges be either removed from the energy storage devices or be accurately controlled to some predefined value.

It is therefore an object of the invention to accurately convert small analog signal amplitudes into their digital equivalent by accurately defining and compensating for induced errors due to residual stored charges within the converter.

SUMMARY OF THE INVENTION

Therefore, in accord with the present invention, an analog-to-digital converter converts an analog signal voltage amplitude into a representative pulse duration by timing the discharge of an energy storage device. The voltage of the analog signal to be converted is initially stored on a storage capacitor. The storage capacitor is coupled to an operational amplifier having an integrating feedback capacitor. The stored charge on the storage capacitor is transferred to the integrating feedback capacitor of the operational amplifier. The time necessary to discharge the integrating feedback capacitor with a constant reference current is a measure of the amplitude of the analog signal. A multivibrator responsive to the discharge of the integrating capacitor generates a pulse whose duration equals the discharge time. This pulse is utilized to enable the application of a periodic pulse source output to a pulse counter. The pulse count achieved is a digital equivalent of the analog signal amplitude.

This constant reference current is supplied by a reference feedback loop responsive to the output of the operational amplifier. The reference feedback loop additionally compensates for error signals and offset voltages in the operational amplifier by supplying a reference current to maintain the storage capacitor and the integrating feedback capacitor at a predetermined offset potential prior to the stored charge transfer operation.

A feature of one embodiment of the present invention is a charge transfer arrangement to permit the accurate analog-to-digital conversion of analog voltages without the necessity of balancing the converter with respect to the reference ground voltage of the analog voltage being converted.

DRAWINGS

Figure 2:
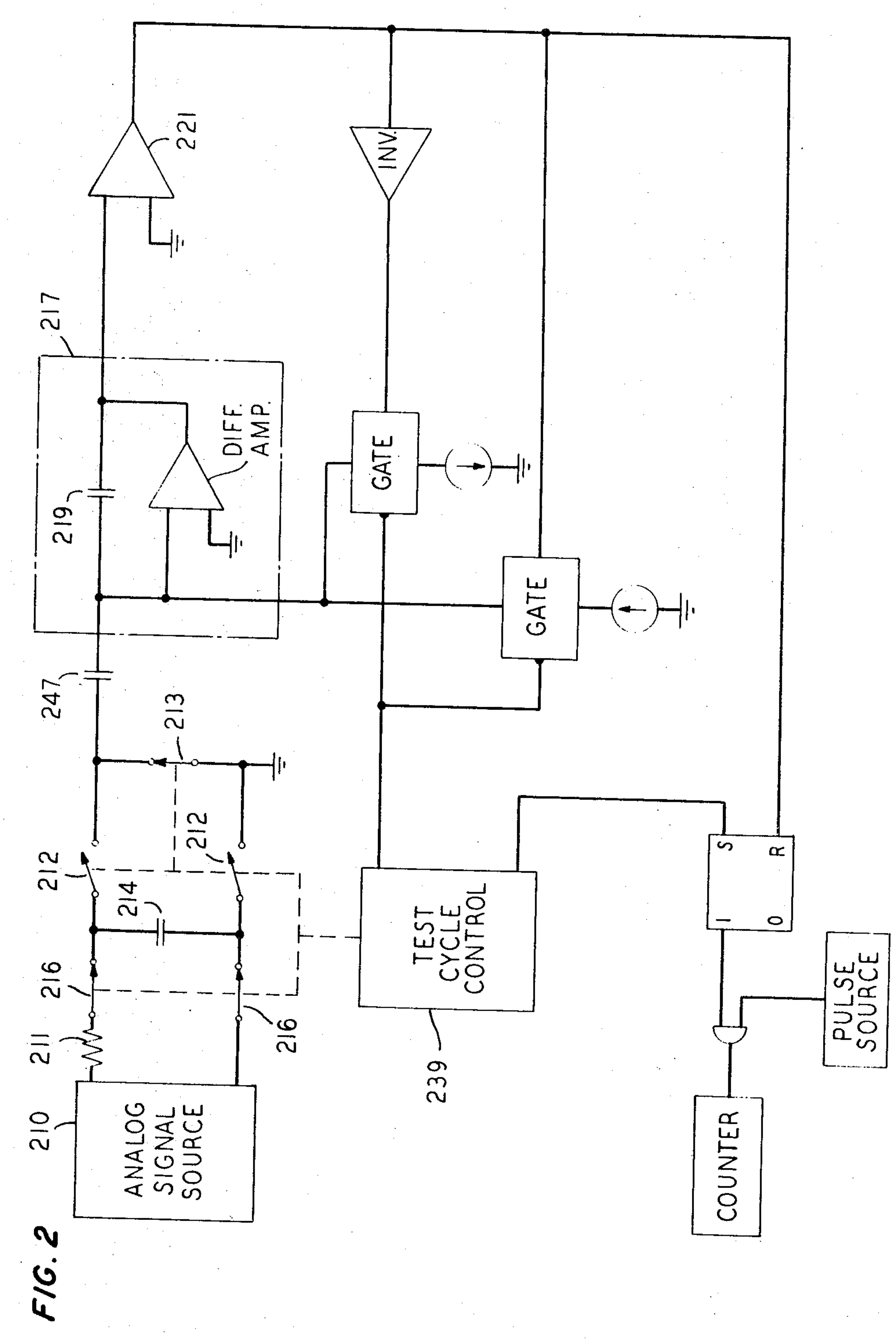
Figure 3:
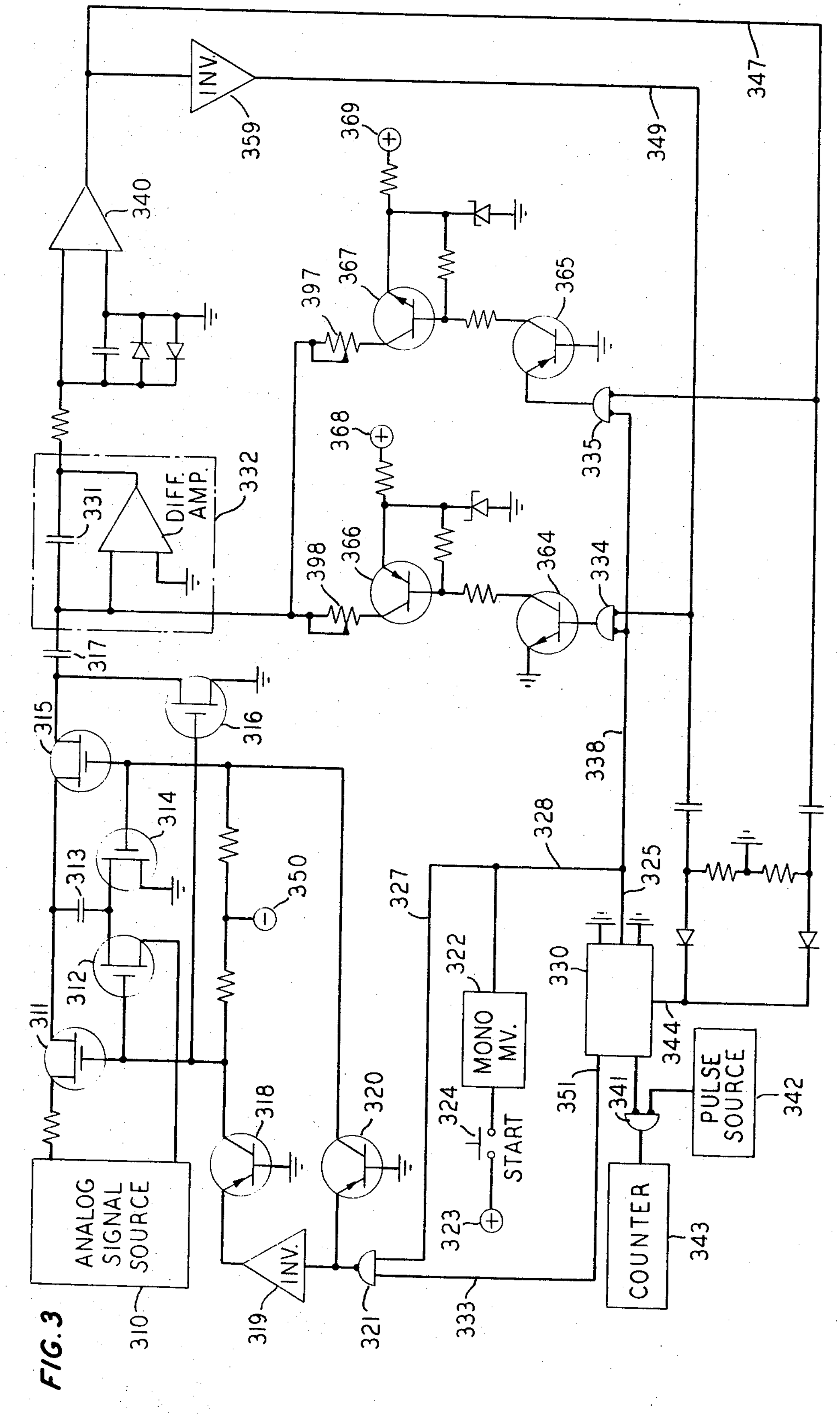

Many additional objects and features of the invention will be apparent upon a reading of the following detailed description in conjunction with the drawings disclosing certain embodiments of the invention wherein:

FIG. 1 is a block diagram of an analog-to-digital converter embodying the principles of applicant's invention;

FIG. 2 is a block diagram of an analog-to-digital converter employing the principles of applicant's invention to convert analog signals into digital signals without balancing the converter with respect to the reference ground voltage of the analog signals; and FIG. 3 is a more detailed schematic diagram partially in block form of an analog-to-digital converter utilizing the principles of the invention.

DETAILED DESCRIPTION

The analog-to-digital converter shown in FIG. 1 samples an analog input voltage and in response thereto generates a pulse whose duration is directly proportional to the magnitude of the sampled analog voltage. This pulse is utilized to gate the output of a periodic pulse source into a pulse counter. The count of gated pulses by the counter is a digital equivalent of the magnitude of the analog voltage being measured. This count may be converted into a binary code for the purposes of transmission to a remote display station or may be directly displayed as a count.

The analog signal whose voltage amplitude is to be measured is supplied by an analog signal source 110, as shown in FIG. 1, having a source impedance 111. The analog signal source 110 may comprise any electrical apparatus containing therein some electrical signal whose voltage is to be measured. The voltage of the analog signal supplied by the source 110 is transmitted, via a closed switch 112, to a storage capacitor 115. The switch 112 remains closed for a sufficient time duration to insure that the entire analog voltage amplitude is stored on the storage capacitor 115.

The opening and closing of the switch 112 and the switch 113 is controlled by a test cycle control 139. The test cycle control 139 may comprise a signal stepping apparatus supplying control signals and operating appropriate switches to control the sequence of converter functions including the opening and closing of the switches 112 and 113. The timing of the signal stepping is selectively designed to allow sufficient time for the storage capacitor 115 to charge to the anticipated amplitude levels of the analog voltages being measured. The design of a test cycle control, as described herein, is believed to be apparent to those skilled in the art and hence, is not discussed in detail.

When sufficient time has elapsed for the storage capacitor 115 to charge to the analog voltage, the test cycle control 139 opens switch 112 and closes the switch 113. The closing of switch 113 permits the charge stored on the capacitor 115 to be transferred to the integrating feedback capacitor 119 of the operational amplifier 117. The operational amplifier 117 comprises a DC high gain differential amplifier 118 with the integrating feedback capacitor 119 interconnecting its output terminal to its inverting input terminal. The noninverting input terminal of the differential amplifier 118 is grounded. The output voltage of the operational amplifier 117 is directly proportional to the charge stored on the integrating capacitor 119. The charge transfer completely exhausts the charge stored on the capacitor 115. This charge transfer is complete because the input of the operational amplifier 117 is a virtual ground thereby permitting the total discharge of the capacitor 115.

The output voltage of the operational amplifier 117 is applied to a comparator circuit 121. The comparator circuit 121 may comprise a high gain limiter amplifier. The high gain and limiting functions of the amplifier produce a binary output responsive to the input signal supplied by the operational amplifier 117. The binary output of the comparator circuit 121 changes state whenever the input signal to the comparator crosses a certain threshold voltage. In an ideal comparator circuit this threshold voltage is theoretically zero, but due to internal biasing currents and component variations this threshold voltage is normally some small fixed voltage. The voltage at the input of the operational amplifier 117 is likewise offset from zero. Additionally, a correction voltage is maintained on the feedback capacitor 119 in order to compensate for this threshold voltage at the input of the comparator 121. When the input signal to the comparator 121 is below the previously mentioned threshold level, its output is a negative signal representative of a logical zero. When the input signal is above this threshold level, its output is a positive signal representative of a logical one.

The output signal of the comparator 121 is applied, via lead 122, to a pair of reference current feedback loops 124 and 125. The feedback loops 124 and 125 are in turn coupled to the input of the operational amplifier 117. The first feedback loop 125 includes the gate 128 which couples a positive current source 130 to the input of the operational amplifier 117 in response to the positive signal output of the comparator 121. The second feedback loop 124 includes an inverter 123 and the gate 127 which couples a negative current source 129 to the input of the operational amplifier 117 in response to the negative signal output of the comparator 121.

When the voltage output of the operational amplifier 117 goes above the threshold voltage of the comparator 121, the comparator output signal is positive and enables the gate 128 thereby applying the positive current output of the current source 130 to the integrating capacitor 119, charging it until the output of the operational amplifier 117 drops below the threshold voltage. As the voltage output of the operational amplifier 117 drops below the threshold voltage, the output of the comparator 121 changes state and generates a negative output signal. This negative output signal is inverted by the inverter 123 and is utilized to enable the gate 127. When enabled, gating circuit 127 applies the negative current output of the current source 129 to the integrating capacitor 119.

The aforedescribed feedback system action is utilized to discharge the store charge due to the analog signal transferred to the integrating capacitor 119 of the operational amplifier 117. The time duration necessary to discharge the stored charge on the integrating capacitor 119, due to the analog signal, is proportional to the magnitude of the analog voltage being measured.

In the interim between the charging and the discharging of charge contained on the integrating feedback capacitor 119, due to the analog signal, the feedback system controls the extraneous residual charges contained on the storage capacitor 115 and the integrating capacitor 119 to permit the accurate analog-to-digital conversion of small voltages. This residual charge control maintains the output potential of the operational amplifier 117 at the threshold voltage of the comparator 121. During the charge transfer period when the stored charge due to the analog signal is being transferred from the storage capacitor 115 to the integrating capacitor 119, the action of the feedback system is discontinued in response to the test cycle control 139. The test cycle control 139 disables the feedback system by applying inhibiting signals to the gates 127 and 128, via leads 147 and 148.

It is readily apparent from the above description that the feedback system maintains residual charges on the storage capacitor 115 and the integrating capacitor 119 prior to the transfer of charge from the storage to the integrating capacitor. During charge transfer the action of the feedback system is inhibited. Following the completion of the charge transfer the action of the feedback system is again enabled permitting the controlled discharge of the integrating capacitor 119. The time duration of the controlled discharge is representative of the amplitude of the analog signal and is reflected in the duration of the pulse output of the bistable multivibrator circuit 132.

The residual charge stored on the integrating capacitor 119 by the feedback system is sufficient to maintain the output of the operational amplifier at the threshold voltage of the comparator 121. The added charge which represents the analog signal, when transferred to the integrating capacitor 119, increases the output potential of the operational amplifier by an amount proportional to the analog voltage amplitude. The change in the stored charge on the integrating capacitor 119 after the charge transfer operation is due only to the analog voltage stored on the charge storage capacitor 115.

The storage capacitor 115 is continuously connected to the integrating feedback capacitor 119 and to the feedback system. Further, the storage capacitor 115 as described above contains a residual charge which is controlled by the operating feedback system. The charge on the charge storage capacitor 115, due to the sampled analog voltage, is modified by the controlled residual charge to compensate for the offset voltage required at the input of the operational amplifier 117.

The test cycle control 139 sets the bistable multivibrator 132 at the beginning of the discharge period during which the feedback system discharges the integrating feedback capacitor 119. The set output of the bistable multivibrator 132 enables the AND gate 135, hence permitting transmission of the pulse train output of the pulse source 133 to the pulse counter 137. When the output of the comparator 121 changes polarity in response to the discharge of the integrating feedback capacitor 119, the bistable multivibrator 132 is reset. The AND gate 135 is disabled and no further pulses are transmitted to the pulse counter 137. The total pulse count is therefore a representation of the amount of charge stored on the integrating feedback capacitor 119 and hence, of the magnitude of the analog voltage to be converted from analog to digital form.

As described above, the analog voltage is sampled and stored on the storage capacitor 115. During the sampling period a controlled residual charge is being maintained on the storage capacitor 115 and the integrating capacitor 119 by the reference current supplied by the feedback system. Charge due to the analog voltage is stored on the storage capacitor 115, and then transferred to the integrating capacitor 119. During the charge transfer period the application of the reference current to the storage capacitor 115 and the integrating capacitor 119 is inhibited. At the end of charge transfer period the bistable multivibrator 132 is set and the reference currents are again applied to the storage capacitor 115 and the integrating capacitor 119. The reference currents discharge the integrating capacitor 119 to the residual charge level whereupon the comparator circuit 121 changes state. This transition of the output signal of the comparator 121 rests the bistable multivibrator 132. The time duration of the set period of the bistable multivibrator 132 corresponds to the amplitude of the analog signal being converted. The errors due to the offset and threshold voltages may amount to several millivolts. By controlling the residual charge, as described above, the conversion of small voltages on the millivolt range may be accurately made.

The analog-to-digital conversion arrangement shown in FIG. 1 is designed to operate in circuit arrangements wherein the conversion apparatus is balanced with respect to the same ground reference voltage as the analog voltage to be converted to digital form. The analog-to-digital converter circuit disclosed in FIG. 2 is utilized in cases where the analog signal and the converter are not balanced with respect to the same ground potential. In this analog-to-digital converter, an additional capacitor 247 is inserted into the charge transfer path to store and supply the residual error correction charge.

The analog signal source 210 including the source resistance 211 is coupled to the gang input switches 216 controlled by the test cycle control 239. When the switches 216 are closed, the analog voltage is transferred to the storage capacitor 214 thus connected in parallel to the analog signal source. This voltage is transmitted to the integrating capacitor 219, via the error correction capacitor 247. The feedback system responsive to the comparator 221 maintains a residual charge on the error correction capacitor 247 and the integrating capacitor 219. This residual charge maintains the offset voltage potential input of the operational amplifier 217 and the threshold voltage input of the comparator 221.

The transfer of charge from the storage capacitor 214 to the integrating feedback capacitor 219 is performed by the successive steps of opening the switches 216 and 213 and closing the gang switches 212. The charge stored on the storage capacitor 214 is not completely discharged, via the error correction capacitor 247, into the integrating capacitor 219. A fractional value of the stored charge proportional to the capacitance ratio of the capacitors 214 and 247 is transferred to the integrating capacitor 219. However, the respective charges are divided among the capacitors 214, 247, and 219 in such a manner that the change in the output voltage of the operational amplifier 217, in response to the charge transfer, is directly proportional to the magnitude of the analog voltage being converted. As is apparent to those skilled in the art, the charge divides during transfer to maintain the residual voltages of the capacitors independent of the charge transfer so that the comparator 221 changes state after a charge representative of the analog signal amplitude is discharged from the integrating feedback capacitor 219.

The foregoing arrangement readily permits the accurate measurement of unbalanced analog voltages without the necessity of performing computations to allow for the residual charges contained by the capacitors. With the exception of the charge transfer arrangement, the converter disclosed in FIG. 2 operates identically with the converter disclosed in FIG. 1.

A detailed combined block and schematic diagram of the analog-to-digital converter shown in FIG. 2 is shown in FIG. 3. The analog signals to be converted to digital form are supplied by the analog signal source 310. The two leads of the analog signal source 310 are respectively connected to one of the current path electrodes of the field effect transistors 311 and 312 whose control electrodes are joined to a common node. Charge storage capacitor 313 is connected between remaining current path electrodes of these field effect transistors 311 and 312. The current path electrodes of the field effect transistors 314 and 315 are also connected to the charge storage capacitor 313. The current path of the field effect transistor 316 interconnects one electrode of an error correction capacitor 317 to ground. Under normal operating conditions, the field effect transistors 311, 312, and 316 are biased into a conducting condition by the negative potential 350. The field effect transistors 314 and 315 are biased into a nonconducting condition by the potential output of the conducting transistor 320. This permits the analog signal to charge the storage capacitor 313 to the analog signal voltage level.

Initially, before the transfer of charge from the storage capacitor 313 to the integrating capacitor 331, the monostable multivibrator 322 and the JK flip-flop 330 are preset and maintained in a state wherein their respective output signals are representative of a logical zero. A JK flip-flop is a bistable multivibrator with a toggle input. A signal applied to the toggle input causes it to change state. JK flip-flops are well known in the art and hence, it is not believed necessary to describe it in detail. These output signals are applied, respectively, via leads 327 and 333 to the AND gate 321. The AND gate 321 includes an inverter in its output circuit and hence generates an output signal representative of a logical one. This signal, representative of a logical one, turns on the transistor 320 and enables conduction therein which in turn biases the field effect transistors 314 and 315 into a nonconducting condition. The output of AND gate 321 is inverted by the inverter 319, and hence, the transistor 318 is biased into a nonconducting condition which permits the field effect transistors 311 and 312 to be biased into a conducting condition by the negative source 350. Hence, as described above, charge due to the analog signal is stored on the storage capacitor 313.

An analog-to-digital conversion is initiated by activating the start button switch 324. This triggers the monostable multivibrator 322 into its quasi-stable state. The monostable multivibrator 322 generates an output pulse representative of a logical one during its quasi-stable state. This signal is applied, via lead 328 and the toggle input 325, to set the JK flip-flop 330. This logical one output is also applied, via lead 327, to the AND gate 321. The output of the set JK flip-flop 330 on lead 351 is representative of a logical zero and hence, the AND gate 321 is disabled. The inverted output of AND gate 321 biases the transistor 320 into a nonconducting condition. Hence, the field effect transistors 314 and 315 are biased into conduction. The field effect transistor 316 is at the same time biased into a nonconduction state, hence permitting the transfer of charge from the storage capacitor 313 to the integrating capacitor 331.

The output signal of the monostable multivibrator 322 in its quasi-stable state is also applied, via leads 338, to the AND gates 334 and 335 disabling transmission therein. The AND gates 334 and 335 are also connected to the comparator 340. With AND gates 334 and 335 disabled, the transistors 364 and 365 are biased into a nonconducting condition. The transistors 366 and 367 are in turn biased into a nonconducting condition. The transistors 366 and 367 in this nonconducting condition disable the application of the reference currents supplied by the potentiometers 397 and 398 energized by the positive and negative sources 368 and 369 to discharge the integrating capacitor 332. Hence, during the charge transfer process, the reference currents supplied by the feedback system are discontinued.

At the completion of the charge transfer, the monostable multivibrator 322 changes into its stable state producing an output signal representative of a logical zero. This signal is applied, via lead 328, to the toggle input 325 of the JK flip-flop 330. The JK flip-flop is set in respose thereto and in turn applies a signal to the AND gate 341 enabling transmission of the clock pulses generated by the pulse source 342 to the pulse counter 343. The output of the monostable multivibrator 322 enables the AND gates 334 and 335 and hence, enables selective transmission of the reference current supplied by the potentiometers 397 or 398 to the integrating capacitor 331 in response to the signal output of the comparator 340. This reference current is applied to the integrating capacitor 331 until it is discharged, whereupon the output signal of the comparator 340 changes state. The change of state of the output signal of the comparator 340 is applied, via the feedback system lead 347 on lead 349 and inverter 359, to the reset input 344 of the JK flip-flop 330. This resets the JK flip-flop 330 and disables the AND gate 341, disabling the application of pulses from the pulse source 342 to the counter 343. The number of pulses counted by the counter is directly proportional to the magnitude of the analog voltage being converted to digital form.

While the principles of the above-described invention have been disclosed in terms of a specific embodiment, many varied modifications and equivalents thereof will be readily apparent to those skilled in the art without departing from the spirit and scope of the invention.

What is claimed is:

1. An analog to digital converter comprising an operational amplifier including an input terminal at virtual ground and an integrating feedback capacitor, signal storage means to store a sample of an analog signal to be converted to digital form, said signal storage means being connected to the input terminal of said operational amplifier, means to transfer said sample from said signal storage means to said integrating feedback capacitor, signal comparison means responsive to said operational amplifier by changing the polarity of its output signal when the output signal of said operational amplifier crosses a threshold voltage, a positive current source to generate a positive polarity current connected to said input terminal, a negative current source to generate a negative polarity current connected to said input terminal, first gating means responsive to one polarity of the output of said signal comparison means to enable the application of said positive current to said input terminal, second gating means responsive to a polarity opposite said one polarity of the output of said signal comparison means to enabel the application of said negative current to said input terminal whereby said positive and negative currents are alternately applied to said input terminal in response to continuous changes in the polarity of the output of said signal comparison means in order to maintain the signal output of said signal comparison means at a substantially zero potential and independent of residual charge stored on said signal storage means and said integrating capacitor, means to time the duration necessary to discharge said integrating capacitor when measuring an analog signal and means to disable the application of said positive and negative current to said input terminal during the operation of said means to transfer.

2. An analog-to-digital converter as claimed in claim 1 wherein said means to time the duration comprises a bistable switching circuit, means to switch said bistable circuit into one state at the beginning of the discharge of said integrating feedback capacitor, means to switch said bistable circuit into a second state at the termination of the discharge of said integrating feedback capacitor in response to the output of said signal comparison means, a periodic pulse source, pulse counting means, and means to apply the output of said periodic pulse source to said pulse counting means in response to said bistable switching circuit during the duration of said one state.

3. An analog-to-digital converter as claimed in claim 2 wherein said means to transfer comprises means to complete a circuit loop including said signal storage means and the input of said operational amplifier, said circuit loop being completed by grounding the appropriate terminal of said storage means whereby the opposite terminal of said storage means is connected to a virtual ground potential existing at the input of said operational amplifier.

4. An analog-to-digital converter comprising an operational amplifier including an integrating feedback capacitor, a source of analog signals, means to store the amplitude of said analog signals including a storage capacitor, means to transfer charge stored on said storage capacitor to said integrating feedback capacitor, differential amplifier means with one input constrained at a reference ground potential, means to connect the output of said operational amplifier to the other input of said differential amplifier means whereby said differential amplifier means responds to the output of said operational amplifier, a first constant current source having one current direction coupled to said storage capacitor and said integrating feedback capacitor, a second constant current source having a current direction opposite to said one current direction coupled to said storage capacitor and said integrating feedback capacitor, first feedback means coupled to and responsive to one polarity of the output of said differential amplifier to enable the application of current from said first constant current source to said storage capacitor and said integrating feedback capacitor, second feedback means coupled to and responsive to the polarity of the output of said differential amplifier opposite to said one polarity to enable the application of current from said second constant current source to said storage capacitor and said integrating feedback capacitor, whereby said first and second constant current sources are continuously alternately enabled to maintain said integrating feedback capacitor and said storage capacitor at a residual potential level appropriate to maintain the output of said differential amplifier at substantially zero potential, means to disable the application of current from said first and second constant current sources to said storage capacitor and said integrating feedback capacitor during the operation of said means to transfer charge, and means to measure the time duration necessary to discharge said integrating feedback capacitor following the operation of said means to transfer charge.

5. An analog-to-digital converter as claimed in claim 4 wherein said means to transfer charge includes an intermediary capacitor interconnecting said storage capacitor and said integrating feedback capacitor, said intermediary capacitor being connected to said first and second constant current sources, whereby a controlled residual charge is maintained on said intermediary capacitor.

References Cited

UNITED STATES PATENTS

| | | | |
|---|---|---|---|
| 3,047,797 | 7/1962 | Borsboom | 330—9 XR |
| 3,368,149 | 2/1968 | Wasserman | 324—99 |
| 3,439,271 | 4/1969 | Metcalf et al. | 324—99 |
| 3,500,109 | 3/1970 | Sugiyama et al. | 324—99 |

R. V. ROLMIC, Primary Examiner

E. F. KARLSEN, Assistant Examiner

U.S. Cl. X.R.

324—130; 340—347